United States Patent Office 3,707,486
Patented Dec. 26, 1972

3,707,486
TRIPHENYLMETHANE TETRAISOCYANATE DERIVATIVES
Gunter Oertel, Cologne-Flittard, Hans Holtschmidt, Leverkusen-Steinbuechel, Manfred Dollhausen, Hitdorf, and Eugen Bock, Leverkusen, Germany, assignors to Bayer Aktiengesellschaft, Leverkusen, Germany
No Drawing. Filed Nov. 24, 1969, Ser. No. 879,524
Claims priority, application Germany, Dec. 4, 1968, P 18 12 565.0
Int. Cl. C09b 11/04
U.S. Cl. 260—389  2 Claims

ABSTRACT OF THE DISCLOSURE

Compositions useful as adhesives having improved bonding characteristics are prepared from natural or synthetic rubber binders and a diphenylmethane tetraisocyanate derivative.

---

This invention relates to organic polyisocyanates and more particularly to tetraisocyanates and to adhesive compositions prepared therefrom.

Polyisocyanates have heretofore been proposed for use on a large scale in the field of adhesives in combination with solutions of widely varying types of polymers. For example, it has been known that solutions of natural or synthetic rubber, such as, for example, nitrile rubber or chloroprene rubber and the like, added to solutions of 4,4′,4″-triphenylmethane triisocyanate can be used to glue together many materials with a strengthened bond having a high resistance to heat. The usefulness of this triisocyanate is considerably limited in many fields, such as, for example, in the leather, artificial leather and shoe processing industries, because adhesive bonds which contain this triisocyanate discolors to a dark violet color especially under the action of light. In order to avoid this disadvantage the use of pale colored isocyanatoaryl phosphoric or thiophosphoric acid derivatives has been suggested in German patent specification No. 1,131,001. However, it has been found that it is not possible to obtain sufficient bond strength and resistance with these or other pale colored polyisocyanates proposed as could be obtained with 4,4′,4″-triphenylmethane triisocyanate. This was found to be particularly true when using adhesives of polychloroprene which are very frequently used in the shoe industry for glueing rubber materials and thus are very important adhesives. Solutions of hydroxyl polyurethanes have become practically indispensable in recent times for bonding the widely used artificial leathers made of polyvinyl chloride.

It is, therefore, an object of this invention to provide adhesive compositions which are devoid of the foregoing disadvantages and problems. A further object of this invention is to provide adhesive compositions possessing improved bonding properties. An additional object of this invention is to provide adhesive compositions having excellent color stability so that there is no violet discoloration of the adhesive on exposure to light. A still further object of this invention is to provide improved adhesive compositions for use as adhesives in the artificial leather and shoe making industry. A still additional object of this invention is to provide novel tetraisocyanates suitable for the preparation of improved adhesive compositions.

The foregoing objects and others which will become apparent from the following description are accomplished in accordance with the invention, generally speaking, by providing adhesives based on diphenylmethane tetraisocyanates having the formula

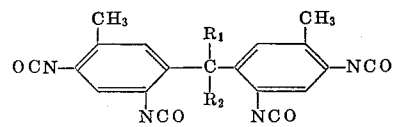

wherein $R_1$ is an alkyl radical containing from 1 to 18 carbon atoms or a phenyl radical which may, if desired, be substituted with alkyl radicals containing 1 to 4 carbon atoms, halogen atoms or nitro groups, and $R_2$ is a hydrogen atom or a $R_1$ radical with the proviso that $R_1$ and $R_2$ may together form a cycloaliphatic ring. More particularly, this invention provides adhesives based on solutions of a binder, preferably natural or synthetic rubber and an organic solvent which is inert to isocyanates and a tetraisocyanate having the formula

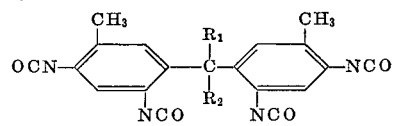

wherein $R_1$ is an alkyl radical containing from 1 to 18 carbon atoms or a phenyl radical which may, if desired, be substituted with alkyl radicals containing 1 to 4 carbon atoms, halogen atoms or nitro groups, and $R_2$ is a hydrogen atom or a $R_1$ radical with the proviso that $R_1$ and $R_2$ may together form a cycloaliphatic ring. The bonds obtained with the adhesive compositions to be used in accordance with the invention have much better bonding results than can be obtained when using any of the previously known polyisocyanates and in addition do not have the disadvantage of undergoing deep purple discoloration under the action of light.

As examples of the polyisocyanates employed in accordance with this invention there may be mentioned, for example, those of the formula

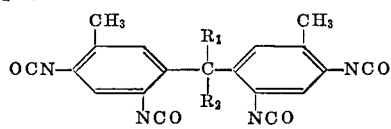

wherein (1) $R_2=H$; $R_1=CH_3-$
(2) $R_2=H$; $R_1=(CH_3)_2-CH-$
(3) $R_2=H$; $R_1=CH_3-(CH_2)_3-CH-C_2H_5$ (4)
$R_2=H$; $R_1=Cl-\langle\phantom{X}\rangle-$ (5) $R_1=R_2=CH_3-$ (6)
$R_1 + R_2 = -(CH_2)_5-$ (7)
$R_1=CH_3-$; $R_2=\langle\phantom{X}\rangle-$ As examples of the radicals which $R_1$ and $R_2$ represent there may be mentioned, for example, alkyl such as methyl, ethyl, propyl, butyl, octyl, nonyl, decyl, dodecyl, tetradecyl, octadecyl and the like, phenyl and substituted phenyl such as chlorophenyl, bromophenyl, nitrophenyl, methylphenyl, ethylphenyl, propylphenyl and butylphenyl. The radicals $R_1$ and $R_2$ may together form a cycloaliphatic ring such as cyclohexyl, cyclopentyl and the like.

The isocyanates employed in the adhesive compositions of the invention are new chemical compounds and are prepared by generally known methods for example, by condensing 2,4-tolylene diamine with various aldehydes or ketones to form tetraamino diphenylmethane derivatives which are phosgenated in a known manner according to procedures known to those skilled in the art to obtain the corresponding tetraisocyanates of the hereinabove set forth formula.

3,3'-dimethyl-4,4',6,6'-tetraisocyanato triphenylmethane is particularly preferred as a tetraisocyanate for use in accordance with this invention not only because it can be easily prepared but also because it can be prepared in a particularly high degree of purity so that its solutions are almost completely colorless and thus are especially suitable for bonding very delicate materials. Furthermore, compared with known polyisocyanates, such as 4,4',4''-triphenylmethane triisocyanate, the excellent color stability of this tetraisocyanate is surprising. Although this tetraisocyanate is also a triphenylmethane derivative, no violet discoloration occurs on exposure to light.

The tetraisocyanate compounds of the invention are used for the preparation of adhesive compositions. The new adhesive compositions may be used for glueing together any material of the same or different types. For example, for bonding leather, textiles, synthetic resins and wood, particularly for bonding rubber or soft polyvinyl chloride materials.

The binders which may be used for the production of adhesives in accordance wtih the invention include, for example, natural or synthetic rubber polymers such as polymers based on dienes such as butadiene or 2-chlorobutadiene-(1,3) or copolymers of dienes such as with styrene, acrylonitrile or other vinyl derivatives, polymers based on hydroxy containing polyethers or polyesters such as polyethylene glycol having a molecular weight of 400, polypropylene glycol having a molecular weight of 500, or polyurethanes obtained from them. Especially preferred binders are polymers of 2-chlorobutadiene-(1,3) including homopolymers and copolymers prepared from it. Also especially preferred are linear or substantially linear hydroxyl polyurethanes which have been prepared from esters of aliphatic or aromatic dicarboxylic acids and alkane diols or from lactones, especially caprolactone, and aromatic or aliphatic diisocyanates such as 2,4-toluene diisocyanate, 2,6-toluene diisocyanate, 4,4'-diphenylmethane diisocyanate, 1,6-hexamethylene diisocyanate and the like.

The adhesive compositions may be prepared by combining the tetraisocyanate described above with inert organic solvent solutions of the binder. As examples of suitable solvent there may be mentioned methylene chloride, trichloroethylene, methyl ethyl ketone and other inert organic solvents of the same type.

It is also possible to modify the adhesive properties in order to obtain an especially durable contact bond or for increasing the cohesive strength of the adhesive layer by incorporating other materials in addition to the hereinabove mentioned binders, such as, for example, natural resins, modified natural resins such as colophony esters, or synthetic resins such as phthalate resins, or other polymers such as chlorine, rubber or soluble polymers or copolymers of vinyl acetate or other vinyl compounds.

EXAMPLES

The invention is further illustrated but is not intended to be limited by the following examples in which all parts and percentages are by weight unless otherwise specified.

EXAMPLE 1

A substantially linear, hydroxyl-containing polyurethane having a molecular weight of about 100,000 which has been prepared from a hydroxyl-containing polyester of adipic acid and ethylene glycol which was linked with toluylene diisocyanate was dissolved in methyl ethyl ketone to give an approximately 22% solution which had a viscosity of 50 poises at 20° C.

About 100 parts of this polyurethane solution was mixed with about 10 parts of a 20% solution of 3,3'-dimethyl-triphenylmethane - 4,4',6,6' - tetraisocyanate in methylene chloride.

Test samples corresponding to DIN 53 274 were prepared from this adhesive composition and also a transparent shoesole material of natural rubber (silicate filler content approximately 27%, Shore hardness A 70 according to DIN 53 505, thickness 4 mm.). The rubber material was thoroughly roughened with sandpaper (grain 40) before the adhesive was applied. The adhesive was applied twice on both sides. The layers of adhesive were then exposed to 250 watt infrared lamps at a distance of 25 cm. for 4 minutes and then placed together and pressed under a pressure of 3.5 excess atmospheres for 5 minutes. After the bond had been produced, the test samples were stored for 9 days at 20° C. The splitting load then required in the splitting test at a spindle feed rate of 100 mm. per minute according to DIN 53 274 at 20° C. was 4.9 kg. wt./cm. Bonds made with the same solution of adhesive which contained, instead of the above-mentioned tetraisocyanate, the same quantity of thiophosphoric acid-tris-(p-isocyanatophenyl) ester (hereinafter termed "Comparison polyisocyanate A") split under a load of 2.1 kg./cm. Those containing tris-(p-isocyanatophenyl)-methane (hereinafter termed "Comparison triisocyanate B") split at 3.0 kg. wt./cm.

When test samples, also stored at 20° C. for 9 days, were subjected to a brief creep test at 50° C. for up to 180 minutes, they withstood a constant splitting load of 0.5 kg. wt./cm. for more than 180 minutes. Bonds prepared with comparison polyisocyanate A split after 45 minutes, and those with comparison polyisocyanate B after 72 minutes.

EXAMPLE 2

Using the adhesive composition described in Example 1 and a rubber shoesole material (containing approximately 25% of silicate filler, Shore hardness A 61) prepared from oil extended butadiene-styrene rubber (oil content 37.5%), bonds were prepared in the same way as described in Example 1. After 9 days, they required a splitting load of 2.8 kg./cm. (with comparison polyisocyanate A 0.8, with comparison isocyanate B 3.0 kg. wt./cm.) in the splitting test at 20° C.

In the short creep test at 50° C., the bonds withstood a constant splitting load of 0.5 kg. wt./cm. for 180 minutes. Bonds prepared with comparison polyisocyanate A split after 22 minutes, those with comparison polyisocyanate B after 180 minutes.

EXAMPLE 3

Using the adhesive composition described in Example 1 and a rubber material (silicate filler content approximately 25%, Shore hardness A 77, thickness 4 mm.) prepared from oil extended butadiene-styrene rubber (80 parts) and a resin of high styrene content (20 parts), bonds were produced as in Example 1. After 9 days, they required a splitting load of 6.4 kg. wt./cm., those with comparison polyisocyanate A 4.0, those with comparison polyisocyanate B 6.1 kg. wt./cm., in the splitting test at 20° C.

In the short creep test at 50° C., the bonds withstood a splitting load of 1.5 kg. wt./cm. for 180 minutes (bonds prepared with comparison polyisocyanate A split after 34 minutes, those with comparison polyisocyanate B withstood the load for 180 minutes).

EXAMPLE 4

Using the adhesive composition described in Example 1, a conventional commercial rubber shoesole material, (mineral filler content approximately 25%, Shore hardness A 92, thickness 4 mm.) was bonded as in Example 1.

In the splitting test at 20° C., these bonds required a splitting load of 5.3 kg. wt./cm., those of comparison polyisocyanate A 2.5 kg. wt./cm., those of comparison polyisocyanate B 4.1 kg. wt./cm.

In the short creep test at 50° C., the bonds withstood a splitting load of 2 kg. wt./cm. for 180 minutes. Bonds

EXAMPLE 5

Using the adhesive composition described in Example 1, a rubber material (silicate filler content approximately 31%, Shore hardness A 85, thickness 4 mm.) prepared from an acrylonitrile-butadiene rubber (acrylonitrile content 33%, Defo hardness 700 according to DIN 53 514) was bonded. After 9 days, the bonds prepared as in Example 1 required a splitting load of 7.2 kg. wt./cm. in the splitting test at 20° C., those of comparison isocyanate A 6.2, those of comparison polyisocyanate B 7.1 kg. wt./cm.

In the short creep test at 50° C., the bonds withstood a splitting load of 2 kg. wt./cm. for 180 minutes. Bonds prepared with comparison polyisocyanate A broke down after 11 minutes, those prepared with comparison polyisocyanate B withstood 180 minutes.

EXAMPLE 6

Using the adhesive composition described in Example 1 and a rubber material (mineral filler content approximately 38%) prepared from polychloroprene of medium crystallization tendency (Defo hardness approximately 300), bonds were prepared according to Example 1.

After 9 days, these bonds required a splitting load of 8.9 kg. wt./cm. in the splitting test at 20° C., those of comparison polyisocyanate A 7.2 kg. wt./cm., those of comparison polyisocyanate B 6.4 kg. wt./cm.

In the short creep test at 50° C., the bonds withstood a splitting load of 2 kg. wt./cm. for 180 minutes. Bonds prepared with comparison polyisocyanate A split after 49 minutes, those prepared with comparison polyisocyanate B after 52 minutes.

EXAMPLE 7

About 50 parts of chloroprene rubber (having a high crystallization tendency and Mooney value 84 according to DIN 53 523) and about 50 parts of chloroprene rubber (medium crystallization tendency and Mooney value 100) were thoroughly masticated together on rollers which were cooled with water. About 4 parts each of magnesium oxide and zinc oxide were worked into the material during this mastication. The rolled sheet obtained was dissolved in a mixture of ethyl acetate, petroleum hydrocarbons (boiling range 65 to 95° C.) and toluene in proportions by weight of 2:2:1 to form a solution which had a viscosity of 20 poises at 20° C. The solids content of the solution was about 23%.

About 100 parts of this solution were mixed with about 10 parts of a 20% solution of 3,3'-dimethyl-triphenylmethane-4,4',6,6'-tetraisocyanate in methylene chloride.

Bonds were prepared in accordance with Example 1 with this adhesive and the natural rubber shoesole material used in Example 1.

After 9 days, these bonds required a splitting load of 5.0 kg. wt./cm. in the splitting test at 20° C., those bonds with comparison polyisocyanate A 2.9 kg. wt./cm., with comparison polyisocyanate B. 3.1 kg. wt./cm.

In the short creep test at 50° C., the bonds withstood a splitting load of 0.25 kg. wt./cm. for 71 minutes, those of comparison polyisocyanate A 25 minutes, those of comparison polyisocyanate B 180 minutes.

EXAMPLE 8

Bonds were prepared as described in Example 1, using the adhesive described in Example 7 and the oil extended rubber shoesole material used in Example 3, which contained a proportion of resin of high styrene content.

After 9 days, these bonds required 5.1 kg. wt./cm. at 20° C. in the splitting test, those of comparison polyisocyanate A 5.0 kg. wt./cm., those of comparison polyisocyanate B. 5.6 kg. wt./cm.

In the short creep test at 50° C., the bonds withstood a splitting load of 0.5 kg. wt./cm. for 180 minutes, bonds with comparison polyisocyanate A 12 minutes, with comparison polyisocyanate B 39 minutes.

EXAMPLE 9

Bonds were prepared in accordance with Example 1, using the adhesive described in Example 7 and the commercial rubber material used in Example 4.

After 9 days, these bonds required a splitting load of 7.8 kg. wt./cm. in the splitting test at 20° C., comparison isocyanate A 6.9 kg. wt./cm., comparison polyisocyanate B 8.2 kg. wt./cm.

In the short creep test at 50° C., the bonds withstood a splitting load of 1.0 kg. wt./cm. for 180 minutes, bonds with comparison polyisocyanate A 15 minutes, with comparison polyisocyanate B 45 minutes.

EXAMPLE 10

Pale crepe rubber was thoroughly masticated on rollers at a roller temperature of about 60° C. The rubber material treated in this way was then dissolved in a mixture of petroleum hydrocarbons and benzene in the proportions by weight of 9:1. The solution which contained 11.9% of rubber had a viscosity of 50 poises at 20° C. About 100 parts of this rubber solution were mixed with about 10 parts of a 20% solution of 3,3'-dimethyltriphenylmethane-4,4',6,6'-tetraisocyanate in methylene chloride.

Bonds were prepared in accordance with Example 1, using this adhesive and the commercial rubber material used in Examples 4 and 7.

After 9 days, these bonds require a splitting load at 20° C. of 2.4 kg. wt./cm. in the splitting test, comparison polyisocyanate A 2.2 kg. wt./cm., comparison polyisocyanate B 2.5 kg. wt./cm.

In the short creep test at 50° C., the bonds withstood a splitting load of 1.5 kg. wt./cm. for 180 minutes, comparison polyisocyanate A 8 minutes, comparison polyisocyanate B 31 minutes.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

EXAMPLE 11

(a) Preparation of

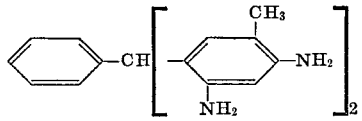

244 g. (2 mols) of 2,4-diamino toluene are dissolved in 1500 g. of methanol at 60° C. At 30 to 40° C. 73 g. (2 mols) of hydrogen chloride are introduced into the solution which is cooled in a water bath. Subsequently 106 g. (1 mol) of benzaldehyde are added during 15 minutes at 60° C. The reaction mixture is thereafter stirred during 6 hours at 60° C. and finally cooled to room temperature. The precipitated crystals of the tetramine hydrochloride are filtered with suction and suspended in 2000 g. of water at 20° C. A solution of 200 g. of NaOH in 1000 g. of water is dropped during 30 minutes at 0 to 5° C. into the suspension. The suspension of tetramine thus obtained is stirred during 4 hours at room temperature. The crystals are filtered with suction and washed with water to remove all traces of NaOH. The crystals are finally dried in vacuo at 80° C.

Yield: 285 to 300 g. (86 g. 90.5%) of light brown crystals. Melting point: 272 to 274° C.

*Analyses.*—Calc. (percent): C, 75.3; H, 7.25; N, 16.9; Cl, 0. Found (percent): C, 75.0; H, 7.7; N, 16.9; Cl, 0.2.

(b) Preparation of

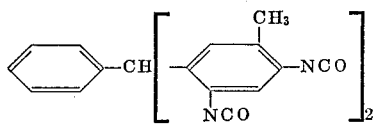

332 g. (1 mol) of finely divided tetramine prepared according to Example 11a are introduced into a solution of 500 g. (about 5 mols) of phosgen in 2000 g. of chlorobenzene, which is stirred and cooled to −5° C. The resulting suspension is stirred overnight at 0 to 10° C. and subsequently heated within 4 hours to up to 110° C. During this heating period phosgen is simultaneously introduced into the suspension. The introduction of phosgen is continued at 110° C. until no further HCl is split off (6 to 8 hours). Into the resulting clear dark solution a flow of nitrogen is introduced at 90 to 100° C. Subsequently some carbon black is added to the solution at 50 to 60° C. which is thereafter stirred during 1 hour at this temperature. The carbon black is filtered off and the solution concentrated at 60° C. under vacuo to a volume corresponding to about 600 g. The concentrated solution of the tetraisocyanate is finally cooled to room temperature, the precipitated crystals are filtered with suction and dried in vacuo at 50 to 60° C.

Melting point: 140 to 142° C.

*Analyses.*—Calc. (percent): NCO, 38.5; Cl, total 0; Cl, saponifiable 0. Found (percent): NCO, 38.1; Cl, 0.25; Cl, saponifiable 0.15.

EXAMPLE 12

(a) Preparation of

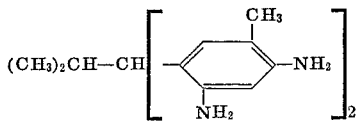

195 g. of 2,4-diamino toluene hydrochloride and 122 g. of 2,4-diamino toluene are dissolved in 2200 g. of ethanol at 60° C. 72 g. of isobutyraldehyde are added to the solution at 60° C. This temperature is maintained during 3 hours. After cooling to room temperature the tetramine hydrochloride precipitates. It is filtered off with suction and introduced into a solution of 50 g. of NaOH in 2 liters of water. The crystals of tetramine thus obtained are filtered with suction and washed with water to remove all traces of NaOH. The tetramine is finally dried at 90° C. in vacuo.

Yield: 200 g. of light yellow crystals. Melting point: 218 to 220° C.

*Analyses.*—Calc. (percent): C, 72.6; H, 8.7; N, 18.8. Found (percent): C, 73.0; H, 9.1; N, 18.7.

(b) Preparation of

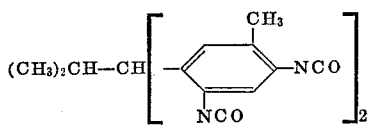

77.5 g. of the tetramine obtained according to Example 12(a) are phosgenated according to the method described in Example 11(b) 100 g. of tetraisocyanate corresponding to above formula are obtained as a dark brown oil.

*Analyses.*—Calc. (percent): C, 65.8; H, 4.5; N, 13.9. Found (percent): C, 64.8; H, 4.8; N, 13.6.

EXAMPLE 13

(a) Preparation of

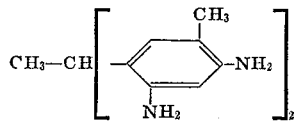

250 g. of 2,4-diamino toluene are introduced into the solution of 100 g. of concentrated sulphuric acid in 2 liters of water. 44 g. of acetaldehyde are dropped to the resulting suspension at 0 to 10° C. The resulting dark clear solution is stirred during 1 hour at 20° C. and then poured into 3 liters of diluted aqueous solution of ammonia. Crystals of the tetramine are filtered with suction and dried in vacuo at 80° C. Yield: 175 g. of light yellow crystals. Melting point: 174 to 175° C.

*Analyses.*—Calc. (percent): C, 71.0; H, 8.15; N, 20.7. Found (percent): C, 70.2; H, 8.4; N, 20.4.

(b) Preparation of

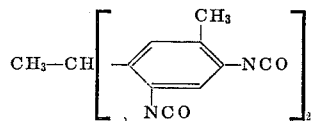

170 g. of tetramine obtained according to Example 13(a) are phosgenated according to the method given in Example 11(b). 159 g. of tetraisocyanate corresponding to above formula are obtained as light brown crystals. Melting point: 96 to 98° C.

*Analyses.*—Calc. (percent): C, 64.2; H, 3.75; N, 15.0; NCO, 45.0. Found (percent): C, 62.9; H, 4.0; N, 14.7; NCO, 46.0.

What is claimed is:

1. Tetraisocyanates of the formula

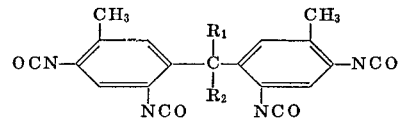

wherein $R_1$ is a member selected from the group consisting of a phenyl radical, or a substituted phenyl radical where the substituents are selected from the group consisting of alkyl radicals of 1 to 4 carbon atoms, chlorine atoms or nitro groups, and $R_2$ is hydrogen.

2. 3,3' - dimethyl - 4,4',6,6'-tetraisocyanato-triphenylmethane.

References Cited

UNITED STATES PATENTS

| | | | |
|---|---|---|---|
| 2,733,261 | 1/1956 | Seeger et al. | 260—389 |
| 2,891,983 | 6/1959 | Bloom et al. | 260—389 |

LORRAINE A. WEINBERGER, Primary Examiner

L. A. THAXTON, Assistant Examiner

U.S. Cl. X.R.

260—5, 75 NT, 77.5 AT, 390, 453 AR, 578